(12) United States Patent
Chen et al.

(10) Patent No.: US 11,994,593 B2
(45) Date of Patent: May 28, 2024

(54) DETECTION METHOD AND DEVICE BASED ON LASER RADAR, AND COMPUTER READABLE STORAGE MEDIUM

(71) Applicant: ZTE CORPORATION, Guangdong (CN)

(72) Inventors: Zeqi Chen, Guangdong (CN); Lei Xue, Guangdong (CN); Xianlin Mei, Guangdong (CN); Pengcheng Lai, Guangdong (CN); Xinke Chen, Guangdong (CN); Yuehui Luo, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 256 days.

(21) Appl. No.: 17/639,905

(22) PCT Filed: Dec. 22, 2020

(86) PCT No.: PCT/CN2020/138365
§ 371 (c)(1),
(2) Date: Mar. 2, 2022

(87) PCT Pub. No.: WO2021/129619
PCT Pub. Date: Jul. 1, 2021

(65) Prior Publication Data
US 2022/0342077 A1  Oct. 27, 2022

(30) Foreign Application Priority Data

Dec. 27, 2019 (CN) .......................... 201911377026.7

(51) Int. Cl.
*G01S 17/931* (2020.01)
*G01S 7/481* (2006.01)
*G01S 17/08* (2006.01)

(52) U.S. Cl.
CPC .......... *G01S 17/931* (2020.01); *G01S 7/4817* (2013.01); *G01S 17/08* (2013.01)

(58) Field of Classification Search
CPC ...... G01S 17/931; G01S 7/4817; G01S 17/08; G01S 7/4808; G01S 17/89; G01S 17/50;
(Continued)

(56) References Cited

U.S. PATENT DOCUMENTS

| 9,170,846 | B2 | 10/2015 | Delling et al. |
| 2013/0282208 | A1 | 10/2013 | Mendez-Rodriguez et al. |
| 2015/0049178 | A1* | 2/2015 | Dunn ................. A61B 5/02028 382/128 |

FOREIGN PATENT DOCUMENTS

| CN | 101808126 A | 8/2010 |
| CN | 102819951 A | 12/2012 |

(Continued)

OTHER PUBLICATIONS

Zte Corporation, International Search Report with English Translation, PCT/CN2020/138365, dated Mar. 30, 2021, 7 pgs.

(Continued)

*Primary Examiner* — Eric Blount
(74) *Attorney, Agent, or Firm* — HAUPTMAN HAM, LLP

(57) ABSTRACT

A detection method and a device based on a laser radar, and a computer readable storage medium are disclosed. The detection method includes: obtaining scanning data of the laser radar; performing an algorithm splitting on a feature algorithm for detection based on the scanning data to obtain at least one sub-algorithm capable of parallel processing in the feature algorithm; and performing a heterogeneous acceleration for the at least one sub-algorithm to process the scanning data and to obtain a processing result; and obtain- (Continued)

ing a detected position of an obstacle and a detected drivable area based on the processing result.

12 Claims, 11 Drawing Sheets

(58) Field of Classification Search
CPC ........... B60W 2420/408; B60W 40/02; B60W 2050/005; B60W 2050/0052; B60W 2554/20; B60W 2554/40; G06V 10/757; G06F 9/3887; G06F 9/3889; G06T 7/11; G06T 7/13; G06T 2207/10028
USPC ........................................................ 340/435
See application file for complete search history.

(56) References Cited

FOREIGN PATENT DOCUMENTS

| CN | 106022245 A | 10/2016 |
|---|---|---|
| CN | 109814552 A | 5/2019 |
| CN | 110134042 A | 8/2019 |
| CN | 110503195 A | 11/2019 |
| JP | H09288179 A | 11/1997 |
| JP | H11345394 A | 12/1999 |
| JP | 2005506625 A | 3/2005 |
| JP | 2012198730 A | 10/2012 |
| JP | 2015036684 A | 2/2015 |

OTHER PUBLICATIONS

Wuling Huang, "Application of Lidar in Perception of Autonomous Driving Environment," Microcontrollers & Embedded Systems, Oct. 1, 2016, 5 pgs.

Notice of Reasons for Refusal issued related in Japanese Application No. 2022-518172; dated Jan. 17, 2023; 6 pgs.

European Search Report issued in corresponding European Application No. 20906665.3; dated Oct. 11, 2022; European Patent Office; 7 pgs.

\* cited by examiner

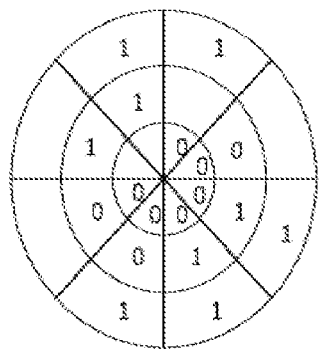
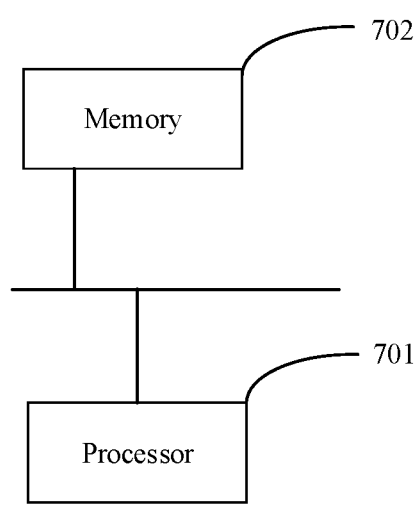
FIG. 12
FIG. 13

US 11,994,593 B2

DETECTION METHOD AND DEVICE BASED ON LASER RADAR, AND COMPUTER READABLE STORAGE MEDIUM

CROSS REFERENCE TO RELATED APPLICATIONS

The present application is a United States National Stage Application filed under 35 U.S.C. § 371 of PCT Patent Application Serial No. PCT/CN2020/138365 filed on Dec. 22, 2020, which claims priority to based on Chinese patent application No. 201911377026.7 filed on Dec. 27, 2019, and claims priority of the Chinese patent application, Each of the above applications which is incorporated herein by reference in its entirety.

TECHNICAL FIELD

Embodiments of the present disclosure relate to the field of heterogeneous computing, and in particular, to a detection method and a device based on a laser radar, and a computer readable storage medium.

BACKGROUND

Conventional autonomous driving systems may be divided into modules such as positioning, perception, fusion, decision-making and planning, and control. Herein, the perception module is an important part of the automatic driving system, which enables a vehicle to obtain surrounding traffic information in time and understand changes in a dynamic environment in order to facilitate subsequent effective information fusion and decision-making and planning. In a process of automatic driving, the surrounding traffic information is transmitted to an electronic control unit (ECU) of the vehicle through various sensors such as a camera, a millimeter wave radar, an ultrasonic radar, and a laser radar.

The laser radar is an important sensor in automatic driving and has characteristics of high measurement resolution, strong anti-interference ability, strong anti-stealth ability, strong penetrating ability and all-weather work. Taking advantage of a turning time of a laser transmitter projected on a detection object, the laser radar may calculate and obtain distance information of the detection object, and draw a three-dimensional point cloud diagram. At the same time, when a laser beam is projected on an object surface, depending on different reflectivity of the object surface, different surface feature information may be generated, which has a very important reference value for target detection and tracking. When used to perceive surrounding environment information of the vehicle, the laser radar may accurately detect distance information of obstacles and object surface properties with a recognition accuracy that is unable to be achieved by sensors such as the camera, the millimeter wave radar. However, a laser radar sensing process has a large data calculation amount. The reliability of the laser radar is directly affected by a low data calculation speed in the current laser radar sensing process.

SUMMARY

Some embodiments of the present disclosure provide a detection method based on a laser radar, including:
obtaining scanning data of the laser radar;
performing algorithm splitting on a feature algorithm used for detection based on the scanning data to obtain at least one sub-algorithm capable of parallel processing in the feature algorithm; and
performing heterogeneous acceleration on at least one of the sub-algorithms to process the scanning data and to obtain a processing result; and
obtaining a detected position of an obstacle and a detected drivable area based on the processing result.

Some embodiments of the present disclosure also provide a computer-readable storage medium storing a computer program that, when executed by a processor, allows the processor to perform the detection method based on the laser radar.

Some embodiments of the present disclosure also provide a detection device based on a laser radar, including a memory and a processor, where the memory stores a computer program that, when executed by the processor, allows the processor to perform the detection method based on the laser radar.

BRIEF DESCRIPTION OF THE DRAWINGS

One or more embodiments are illustrated with reference figures in the corresponding accompanying drawings. These illustrative descriptions do not constitute a limitation on the embodiments. The elements with the same reference numerals in the accompanying drawings are represented as similar elements. Unless otherwise stated, the figures in the accompanying drawings do not constitute a scale limitation.

FIG. 12 is a ground coloring effect diagram according to a fourth embodiment of the present disclosure.

FIG. 13 is a schematic structural diagram of a detection device based on a laser radar according to a seventh embodiment of the present disclosure.

DETAILED DESCRIPTION

Figure 1:
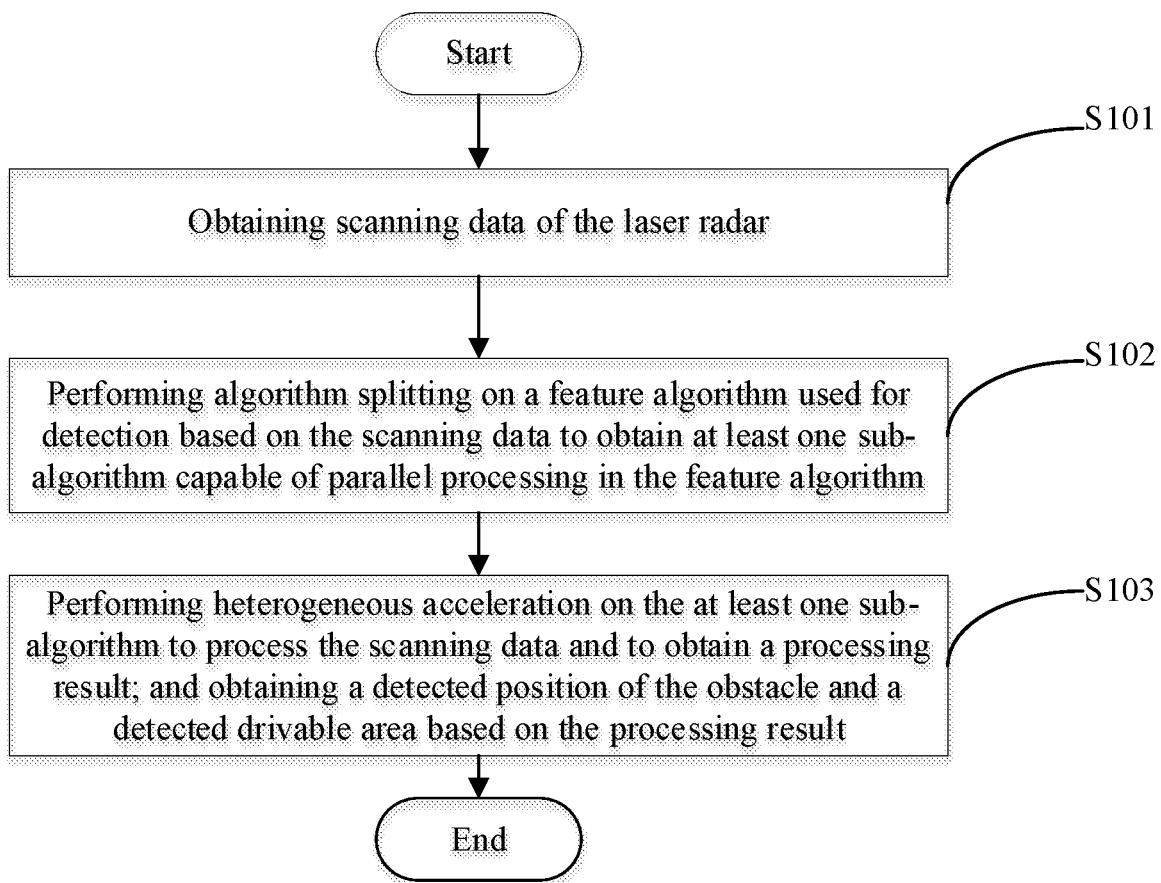
FIG. 1 is a flowchart of a detection method based on a laser radar according to a first embodiment of the present disclosure.

In order to make the purposes, the technical solutions, and the advantages of the embodiments of the present disclosure clearer, various embodiments of the present disclosure will be described in detail below with reference to the accompanying drawings. However, those of ordinary skill in the art may understand that in each embodiment of the present disclosure, many technical details are proposed in order to enable the reader to better understand the present disclosure. However, even without these technical details and various changes and modifications based on the following embodiments, the technical solutions claimed in the present disclosure may be realized.

The purposes of the embodiments of the present disclosure are to provide a detection method and a device based on a laser radar, and a computer-readable storage medium, which can increase data operation speed in a laser radar sensing process, thereby improving reliability of the laser radar.

In order to solve the above technical problems, some embodiments of the present disclosure provide a detection method based on a laser radar, including:

obtaining scanning data of the laser radar;

performing algorithm splitting on a feature algorithm used for detection based on the scanning data to obtain at least one sub-algorithm capable of parallel processing in the feature algorithm; and performing heterogeneous acceleration on the at least one sub-algorithm to process the scanning data and to obtain a processing result; and obtaining a detected position of an obstacle and a detected drivable area based on the processing result.

In some examples, performing the algorithm splitting on the feature algorithm used for detection based on the scanning data to obtain the at least one sub-algorithm capable of parallel processing in the feature algorithm specifically includes: performing the algorithm splitting on a first feature algorithm used to detect a position of the obstacle based on the scanning data and on a second feature algorithm used to detect a drivable area based on the scanning data, to obtain a plurality of first sub-algorithms capable of parallel processing in the first feature algorithm and a plurality of second sub-algorithms capable of parallel processing in the second feature algorithm. Performing the heterogeneous acceleration on the at least one sub-algorithm to process the scanning data specifically includes: performing the heterogeneous acceleration on at least one of the plurality of first sub-algorithms and/or at least one of the plurality of second sub-algorithms to process the scanning data.

In some examples, the first feature algorithm includes: a fitting algorithm for fitting a ground based on the scanning data; a segmentation clustering algorithm for segmenting and clustering the obstacle based on a result of fitting the ground; an edge extraction algorithm for extracting an edge frame of the obstacle based on a result of the segmentation and clustering; and a position recognition algorithm for recognizing the position of the obstacle based on the edge frame. Performing the algorithm splitting on the first feature algorithm used to detect the position of the obstacle based on the scanning data specifically includes: performing the algorithm splitting on at least one of the fitting algorithm, the segmentation clustering algorithm, the edge extraction algorithm, and the position recognition algorithm.

In some examples, when performing the algorithm splitting on the edge extraction algorithm, the edge extraction algorithm is split into following operations: extracting coordinates of M two-dimensional mapping outer contour points of the obstacle based on the result of the segmentation and clustering, here M is an integer greater than 1; obtaining M fitting straight lines based on the coordinates of the M two-dimensional mapping outer contour points, and calculating M inclination angles of the M fitting straight lines, here one of the two-dimensional mapping outer contour points corresponds to one inclination angle; rotating corresponding two-dimensional mapping outer contour points based on the inclination angles to obtain a cube frame of the obstacle. In this way, it is possible to perform the algorithm splitting on the edge extraction algorithm in the first feature algorithm that takes a long time to calculate, so as to perform the heterogeneous acceleration on the operations that satisfy a heterogeneous acceleration condition in the edge extraction algorithm, thereby improving data calculation speed in the laser radar sensing process and reliability of the laser radar.

In some examples, performing the heterogeneous acceleration on at least one of the plurality of first sub-algorithms and/or at least one of the plurality of second sub-algorithms specifically is: performing the heterogeneous acceleration on at least one of the edge extraction algorithms. Performing the heterogeneous acceleration on at least one of the edge extraction algorithms specifically includes: parallel operations of obtaining the M fitting straight lines based on the coordinates of the M two-dimensional mapping outer contour points.

In some examples, the second feature algorithm includes: a classification storage algorithm for the scanning data by a 360-degree grid classification and storage; a ground point determining algorithm for acquiring ground points in the scanning data based on a result of the 360-degree grid classification storage, and performing a preliminary coloring processing on the ground points; a grid coloring algorithm of the drivable area obtained by establishing a grid image based on the ground points and performing a refined coloring processing on the grid image. Performing the algorithmic splitting on the second feature algorithm used by the laser radar to detect the drivable area based on the scanning data specifically includes: performing the algorithmic splitting on at least one of the classification storage algorithm, the ground point determining algorithm, and the grid coloring algorithm.

In some examples, when performing the algorithmic splitting on the classification storage algorithm, the classification storage algorithm is split into following operations: obtaining polar coordinates of original laser radar points based on the scanning data; dividing a scanning area of the laser radar by a preset radian to obtain N sectors, here N is an integer greater than 1; storing each of the original laser radar points in a two-dimensional array by sector based on a sector where the polar coordinates of each of the original laser radar points are located. In this way, it is possible to perform the algorithm splitting on the classification storage algorithm in the second feature algorithm that takes a long time to calculate, so that the classification storage algorithm may satisfy the heterogeneous acceleration condition to perform the heterogeneous acceleration on the classification storage algorithm, which further improve data calculation speed in the laser radar sensing process, and reliability of the laser radar.

In some examples, performing the heterogeneous acceleration on at least one of the plurality of first sub-algorithms and/or at least one of the plurality of second sub-algorithms specifically is: performing the heterogeneous acceleration on at least one of the classification storage algorithms. Performing the heterogeneous acceleration on at least one of the plurality of second sub-algorithms specifically includes: parallel operations of processing the original laser radar points in a plurality of sectors.

In some examples, performing the algorithm splitting on at least one of the classification storage algorithm, the ground point determining algorithm, and the grid coloring algorithm specifically is: performing the algorithmic splitting on the grid coloring algorithm. Performing the algorithmic splitting for the grid coloring algorithm specifically is: splitting the grid coloring algorithm into following operations: determining whether each grid in the grid image is a ground, and performing a coloring processing on the grid determined to be the ground. In this way, it is possible to perform the algorithm splitting on the grid coloring algorithm in the second feature algorithm that takes a long time to calculate, so that the grid coloring algorithm may satisfy the heterogeneous acceleration condition to perform the heterogeneous acceleration on the grid coloring algorithm, which can further improve data calculation speed in the laser radar sensing process, and reliability of the laser radar.

In some examples, performing the heterogeneous acceleration on at least one of the plurality of first sub-algorithms and/or at least one of the plurality of second sub-algorithms specifically is: performing the heterogeneous acceleration on at least one of the plurality of second sub-algorithms. Performing the heterogeneous acceleration on at least one of the plurality of second sub-algorithms specifically includes: parallel operations of determining whether each grid in the grid image is the ground.

A first embodiment of the present disclosure relates to a detection method based on a laser radar. The specific process of this embodiment is shown in FIG. 1 and includes following operations.

S101, obtaining scanning data of the laser radar.

Specifically, a large amount of scanning data may be generated during an operation of the laser radar. These scanning data include but are not limited to distances, position coordinates and the like of original laser points. In this embodiment, obtained scanning data is original laser radar point cloud data.

S102, performing algorithm splitting on the feature algorithm used for detection based on the scanning data to obtain at least one sub-algorithm capable of parallel processing in the feature algorithm.

Specifically, there may be one or a plurality of feature algorithms that may be split in this embodiment. For example, in this embodiment, the feature algorithm may include a target detection and tracking algorithm and a drivable area recognition algorithm. The target detection and tracking algorithm may detect a position of an obstacle, and track the obstacle at the position where the obstacle is detected. The drivable area recognition algorithm may detect a drivable area to satisfy a basic condition of autonomous driving.

S103, performing heterogeneous acceleration on the at least one sub-algorithm to process the scanning data and to obtain a processing result, and obtaining a detected position of the obstacle and a detected drivable area based on the processing result.

Specifically, the heterogeneous acceleration is a special form of parallel and distributed acceleration, which uses either a single independent computer that may support single instruction multiple data (SIMD) and multiple instruction multiple data (MIMD) at the same time, or a group of independent computers interconnected by a high-speed network to complete a calculation task. The heterogeneous acceleration may use machines with different performances and structures coordinately to satisfy different computing needs, and enable codes (or code segments) to be executed in a way that maximizes overall performance. Taking the feature algorithm as the target detection and tracking algorithm as an example, the target detection algorithm includes a plurality of sub-algorithms, and performing the heterogeneous acceleration on at least one of the sub-algorithms to process scanning data may speed up operation speed of a system and reduce CPU occupancy rate of the algorithm.

In the embodiment of the present disclosure, the algorithm splitting is performed on the feature algorithm used for detection based on the scanning data to obtain at least one sub-algorithm capable of parallel processing in the feature algorithm. Since the feature algorithm has a plurality of implementation processes, at least one sub-algorithm capable of parallel processing in the feature algorithm is obtained by splitting the implementation processes of the feature algorithm, so as to satisfy a heterogeneous acceleration condition. Then, the heterogeneous acceleration is performed on at least one of the sub-algorithms to process the scanning data. Since the sub-algorithms that may be processed in parallel are algorithms with large data volume, long calculation time and high CPU occupancy rate, overall time consumed of a laser radar perception algorithm may be effectively reduced by performing the heterogeneous acceleration on at least one sub-algorithm, thereby improving data calculation speed in the laser radar sensing process and reliability of the laser radar. In addition, since the sub-algorithm with a higher CPU occupancy rate greatly reduces the CPU occupancy rate after the heterogeneous acceleration, it is possible to select processors and heterogeneous computing devices with lower power consumption and cost, which can reduce production cost of target detection devices based on the laser radar.

A second embodiment of the present disclosure relates to a detection method based on a laser radar. The second embodiment is further improved on the basis of the first embodiment. The specific improvement lies in: in the second embodiment, the feature algorithm is further refined: the feature algorithm includes a first feature algorithm for detecting a position of an obstacle based on the scanning data, and a second feature algorithm for detecting a drivable area based on the scanning data. The first feature algorithm includes a fitting algorithm, a segmentation clustering algorithm and a position recognition algorithm. And in the second embodiment, algorithm splitting is performed on the fitting algorithm of the first feature algorithm. In this way, it is possible to perform the algorithm splitting on the time-consuming edge extraction algorithm in the first feature algorithm so that algorithm operations of the edge extraction algorithm satisfy a heterogeneous acceleration condition to perform the heterogeneous acceleration on the edge extraction algorithm, which can further improve data operation speed in a laser radar sensing process, thereby further improving reliability of the laser radar.

Figure 2:
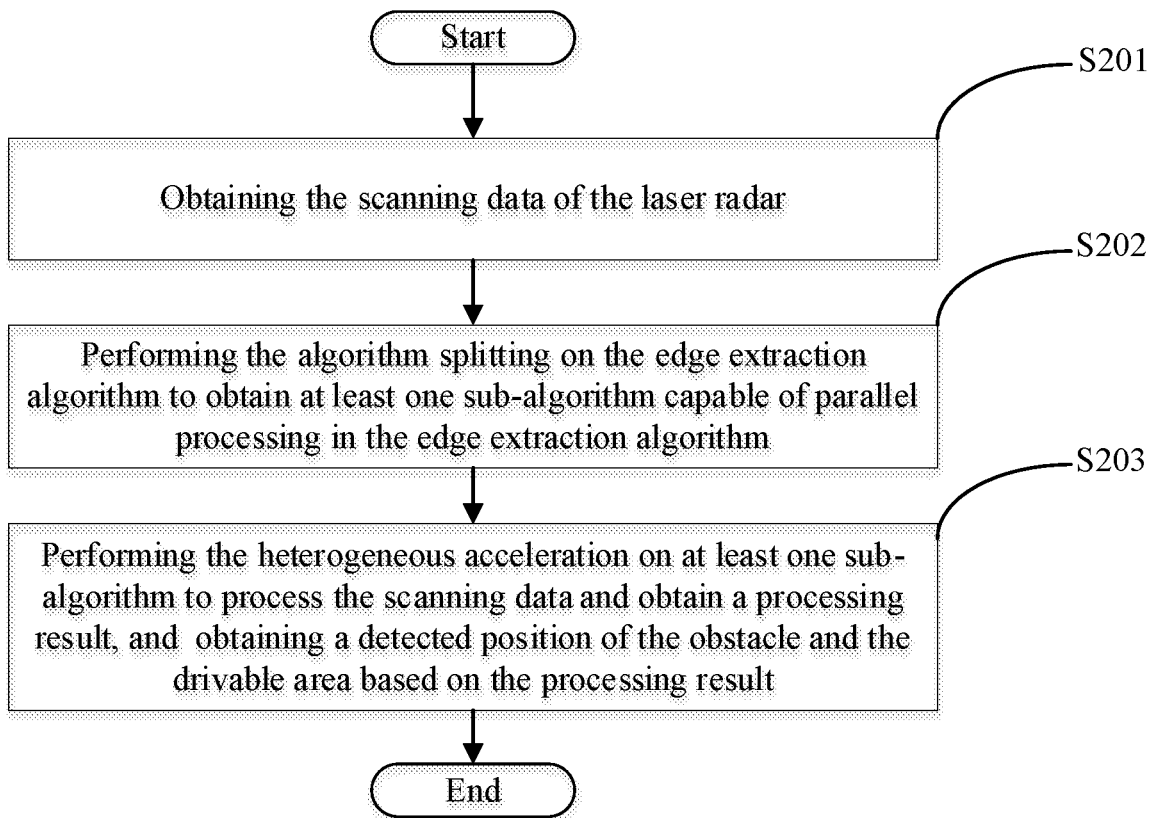
FIG. 2 is a flowchart of a detection method based on a laser radar according to a second embodiment of the present disclosure.

The specific process of this embodiment is shown in FIG. 2 and includes following operations.

S201, obtaining the scanning data of the laser radar.

S202, performing the algorithm splitting on the edge extraction algorithm to obtain at least one sub-algorithm capable of parallel processing in the edge extraction algorithm.

Specifically, in this embodiment, the first feature algorithm is a target detection and tracking algorithm, which includes the fitting algorithm for fitting a ground based on the scanning data; the segmentation clustering algorithm for segmenting and clustering the obstacle based on a result of fitting the ground; the edge extraction algorithm for extracting an edge frame of the obstacle based on a result of the segmentation and clustering; and a position recognition algorithm for recognizing the position of the obstacle based on the edge frame. It is understandable that this embodiment can improve the data operation speed in the laser radar sensing process by performing the algorithm splitting on the edge extraction algorithm.

Figure 3:
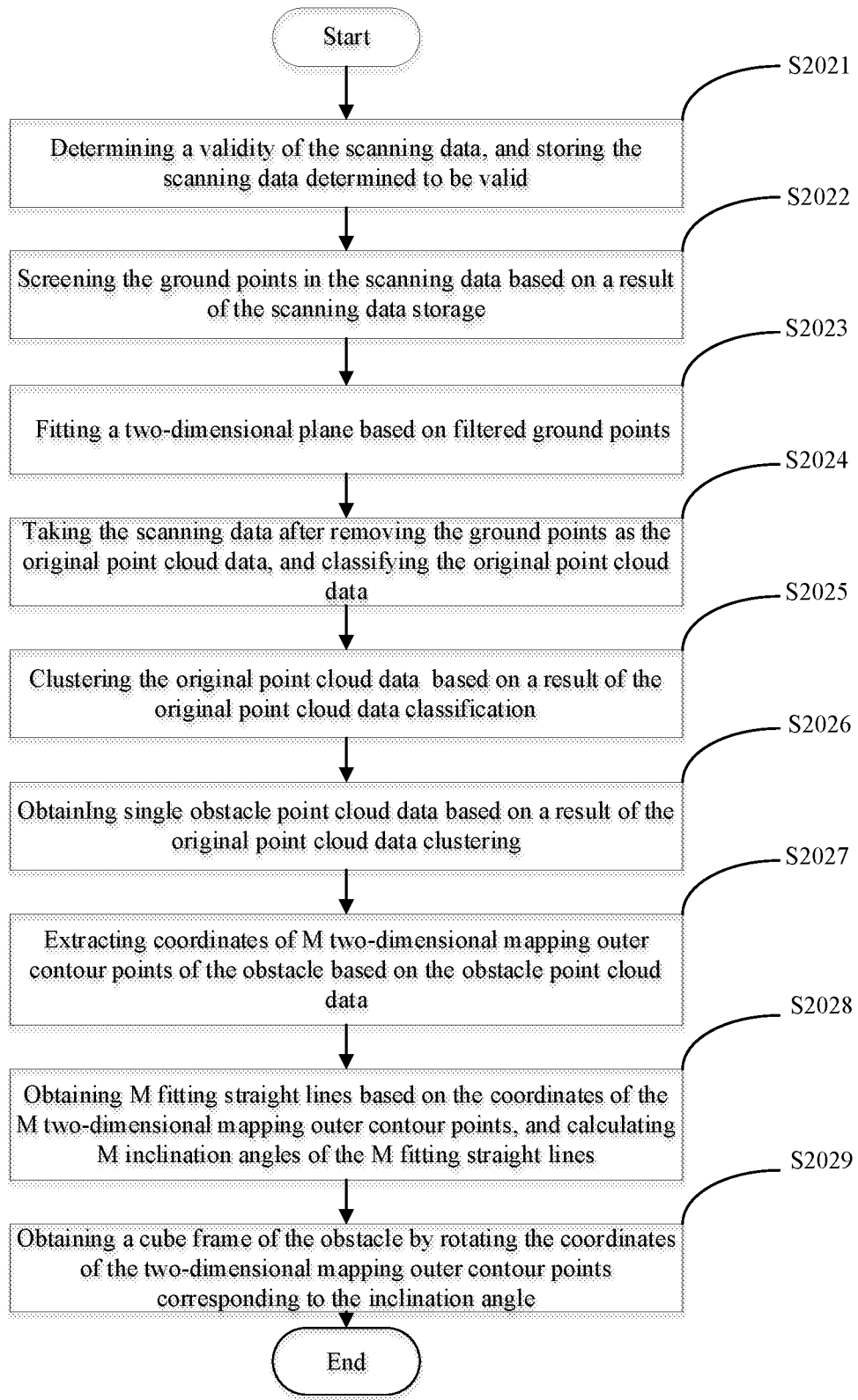
FIG. 3 is a flowchart of a target detection and tracking method according to a second embodiment of the present disclosure.

In order to facilitate understanding and provide further detailed description of the target detection and tracking algorithm, as shown in FIG. 3, the target detection and tracking algorithm may include following operations.

S2021, determining a validity of the scanning data, and storing the scanning data determined to be valid.

Regarding S2021, specifically, the scanning data includes distance and height information of original laser radar points. The distance is a distance between the original laser radar point and an initial center point of the laser radar, and the height is a height from the original laser radar points to the ground. A distance threshold and a height threshold are preset. When the distance is greater than the distance threshold, the original laser radar point is determined to be invalid. When the height is greater than the height threshold, the original laser radar point is determined to be invalid. It is worth mentioning that in this embodiment, valid data in the scanning data is stored in sequence. All stored point cloud data is divided based on polar coordinates, with 2 degrees as a sector, and all coordinate points are formed in a two-dimensional array according to a sector where each of the coordinate points is located. It is understandable that those skilled in the art may also divide the sector based on other radians, which is not specifically limited in this embodiment.

S2022, screening the ground points in the scanning data based on a result of the scanning data storage.

Regarding S2022, specifically, taking each sector as an individual, a lowest point in a Z-axis direction of all laser point cloud data is found in each sector, and each point in this sector is compared with the lowest point, and a value of the point in the Z-axis direction is compared with a height from an installation position of the laser radar to the ground. If the value of the point in the Z-axis direction is below a certain height, the laser point is initially considered to be the ground point. By repeating this process, point sets in all the sectors are traversed. In other words, when a height of the laser point cloud data is lower than a certain height (which may be preset according to actual needs), the point is determined to be the ground point.

S2023, fitting a two-dimensional plane based on filtered ground points.

Regarding S2023, specifically, screened ground points are used for fitting with a random sample consensus (RANSAC) algorithm to fit the two-dimensional plane, obtain parameter values of a plane equation $ax+by+cz+d=0$ (herein a, b, c, and d are all constants, and x, y, and z are independent variables) and ensure that the parameter c of z in the plane equation is a positive number. Using the plane equation fitted with the above method, each point of the effective point cloud data set is compared with a value in the Z-axis direction of the same X-axis and Y-axis position points on the plane. The points in a reasonable range (the reasonable range may be preset according to actual needs) are considered to be the ground points, and the rest are classified as non-ground points.

It should be noted that the above S2021 to S2023 are operations of the fitting algorithm, and the fitted ground may be obtained by performing S2021 to S2023.

S2024, taking the scanning data after removing the ground points as the original point cloud data, and classifying the original point cloud data.

Figure 4:
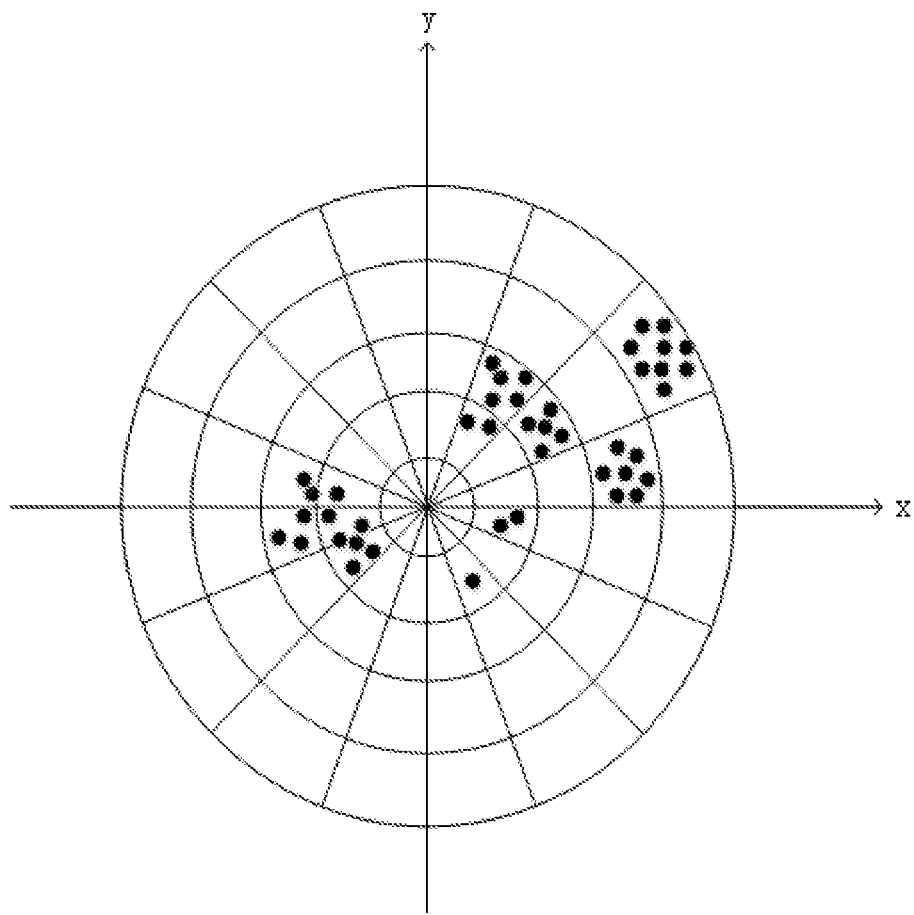
FIG. 4 is a polar coordinate grid point cloud division diagram according to a second embodiment of the present disclosure.

Regarding S2024, specifically, as shown in FIG. 4, the original point cloud data is separated based on a maximum distance and a maximum height, and the remaining data is a segmentable part. Data of this part is saved as a two-dimensional array based on a polar coordinate grid method, and each array unit saves all point set data in the grid. The gird data saved above is used to establish a corresponding two-dimensional array P (200*360). Each grid with data is marked with 1, and grids without data are marked with 0. The two-dimensional arrays obtained are expanded to eliminate isolated grid points. It is understandable that in the original point cloud data, data that is far from a center point of the laser radar or high in height may be regarded as invalid data (that is, it may be concluded that the data does not represent obstacles). The invalid data may be separated out by separating the original point cloud data based on the maximum distance and the maximum height, which can greatly reduce calculation amount in subsequent operations, and further improve computing performance of a laser radar perception algorithm.

S2025, clustering the original point cloud data based on a result of the original point cloud data classification.

Figure 5:
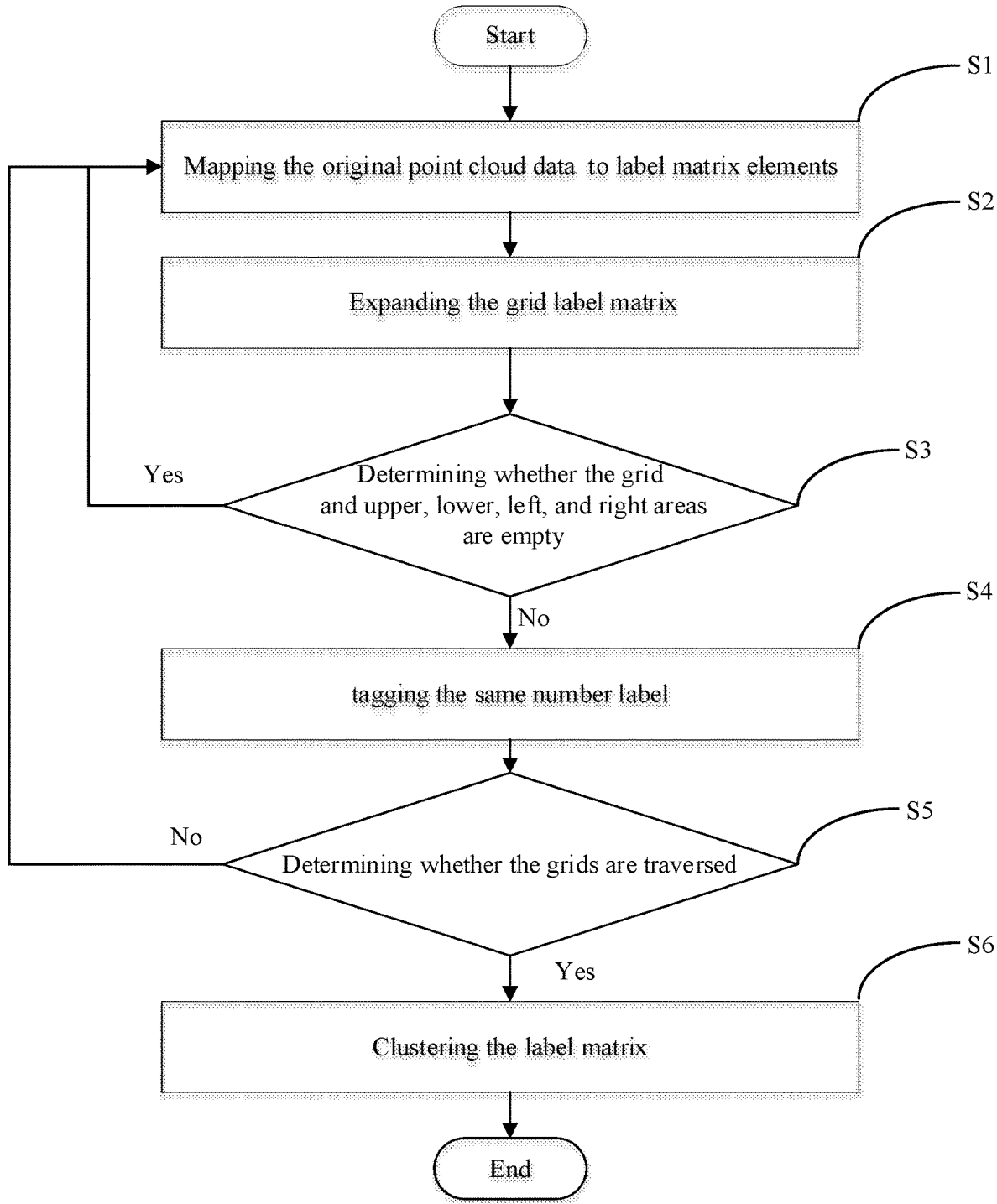
FIG. 5 is a flowchart of point cloud clustering according to a second embodiment of the present disclosure.

Regarding S2025, specifically, based on the two-dimensional array P data in the above operations, each data point is traversed to determine whether points of 8 locations around the point are 1. In response to a determining result being 1, these grid area points are classified into the same type, that is, the points composed of the same obstacle points. In response to the determining result being 0, the above determination is performed on next P data point position until all points in P are traversed. The points formed by grids corresponding to all P points of the same type are point sets of the same obstacle. As shown in FIG. 5, the original point cloud data may be clustered through the following operations. In S1, mapping the original point cloud data to label matrix elements. In S2, expanding the grid label matrix. In S3, determining whether the grid and upper, lower, left, and right areas are empty. In response to the grid and the upper, lower, left, and right areas being empty, step S1 is performed. In response to the grid and the upper, lower, left, and right areas being not empty, step S4 is performed. In S4, tagging the same number label. In S5, determining whether the grids are traversed. In response to the grids being traversed, step S6 is performed. In response to the grids being not traversed, step S1 is performed. In S6, clustering the label matrix.

S2026, obtaining single obstacle point cloud data based on a result of the original point cloud data clustering.

Regarding S2026, specifically, each obtained obstacle point is used to classify all the laser point cloud data in the grid where the obstacle point is located into the same category to obtain the obstacle point cloud data.

It is worth mentioning that the above S2024 to S2026 are operations of the segmentation clustering algorithm. The obstacles may be segmented and clustered by performing S2024 to S2026.

S2027, extracting coordinates of M two-dimensional mapping outer contour points of the obstacle based on the obstacle point cloud data.

Regarding S2027, specifically, M is an integer greater than 1. In this embodiment, the coordinates of two-dimensional mapping outer contour points may be extracted by following operations. Firstly, the grid is designed and maximum and minimum points in a X direction or a Y direction (the following is based on the X direction) of the obstacle point cloud data is found out. Grids with equal radian are appropriately set based on a distance from these points to the origin point (based on an angle and a distance of a laser radar beam). The longer the distance, the greater a grid spacing is. The point cloud is segmented, the grid where each point is located is found based on their X-axis coordinate values by a quick sorting method, and the point is put into the grid. And a maximum value point and a minimum value point in a Y-axis direction in each grid are saved.

S2028, obtaining M fitting straight lines based on the coordinates of the M two-dimensional mapping outer contour points, and calculating M inclination angles of the M fitting straight lines.

Regarding S2028, specifically, one of the two-dimensional mapping outer contour points corresponds to one inclination angle. All the point sets obtained in S2027 are used to fit a plane straight line with a principle of random sampling consistency, an angle β between the straight line and the X axis is calculated, and then the inclination angle of the straight line may be obtained.

S2029, obtaining a cube frame of the obstacle by rotating the coordinates of the two-dimensional mapping outer contour points corresponding to the inclination angle.

Regarding S2029, specifically, based on the included angle β obtained in step 2 (the angle between a fitted straight line and the X-axis direction), coordinates of all the point sets obtained in step 1 are rotated by β, that is:

Point[$i$]·$x$_new=Point[$i$]·$x$*cos β−Point[$i$]·$y$*sin β

Point[$i$]·$y$_new=Point[$i$]·$x$*sin β+Point[$i$]·$y$*cos β

Obstacle information of the drawn cube frame includes the obstacle's speed, the number of points, center point coordinates, three-dimensional frame corner point coordinates, tracking id number, category, and last tracked time.

Figure 6:
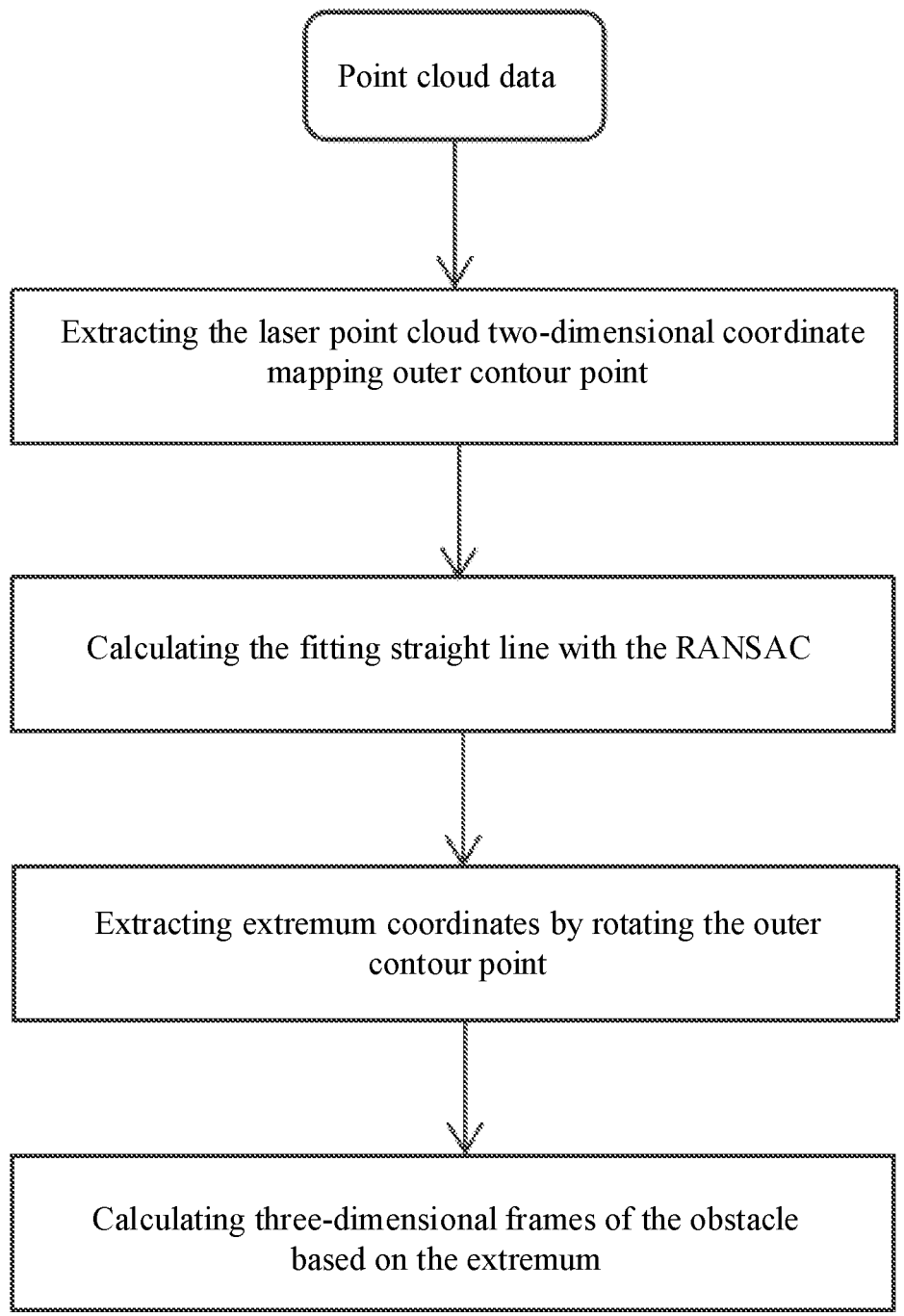
FIG. 6 is a flowchart of extracting an outer contour frame of an obstacle according to a second embodiment of the present disclosure.

It is worth mentioning that the above S2027 to S2029 are operations of the edge extraction algorithm. The position of the obstacle may be detected by performing the operations S2027 to S2029. In general, as shown in FIG. 6, the extraction of an outer contour frame of the obstacle may be divided into the following operations: extracting the laser point cloud two-dimensional coordinate mapping outer contour point, calculating the fitting straight line with the RANSAC, extracting extremum coordinates by rotating the outer contour point, and calculating three-dimensional frames of the obstacle based on the extremum.

Preferably, after obtaining the cube frame of the obstacle, a queue is set to store a tracked target, and then coordinate information of all obstacles is converted to a global coordinate system. The specific process of tracking is as follows. Firstly, a correlation matrix is calculated. Based on all obstacles in the point cloud of a previous frame and all obstacles in the point cloud of a current frame, a cost function is calculated by calculating a distance difference and a point difference between each target object in the two frames, thereby establishing an association matrix of all objects in the two frames. Hungarian algorithm is used for matching, and an optimal result of matching and tracking in the two frames is obtained. A latest tracking object list is updated. A new obstacle may be assigned a new id number, a frame of the new obstacle may be re-drawn and a category of the new obstacle may be re-recorded.

Figure 7:
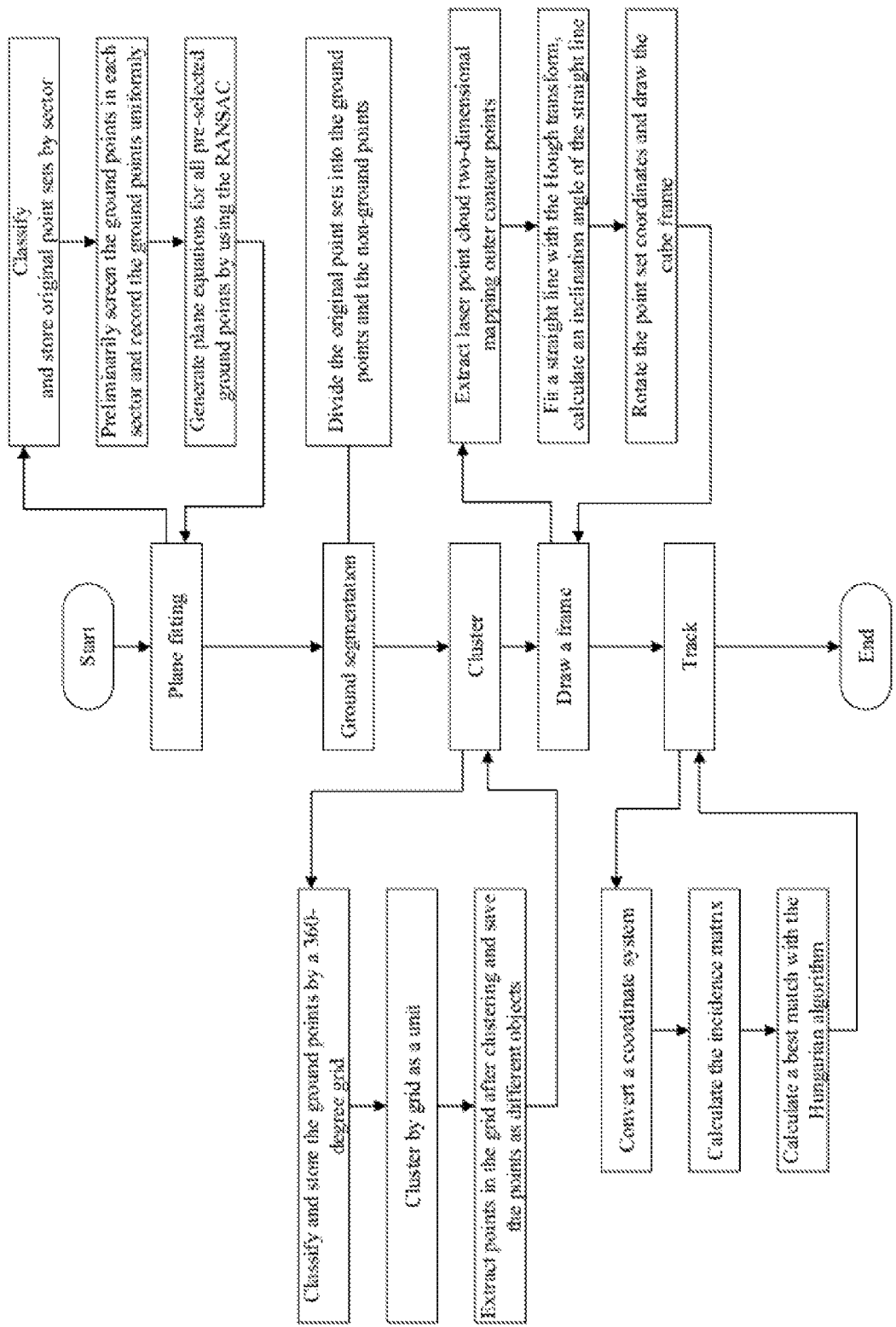
FIG. 7 is a flowchart of splitting a target detection and tracking algorithm according to a second embodiment of the present disclosure.

As shown in FIG. 7, in general, the target detection and tracking algorithm may be divided into following operations: plane fitting, ground segmentation, clustering, drawing frames and tracking. The process of plane fitting may be specifically divided into operations of "classifying and storing original point sets by sector", "preliminarily screening the ground points in each sector and recording the ground points uniformly", "generating plane equations for all pre-selected ground points by using the RANSAC". The process of ground segmentation is to use the plane equations to divide the original point sets into the ground points and the non-ground points. The clustering process may be specifically divided into operations of "classifying and storing the non-ground points by a 360-degree grid", "clustering by grid as a unit", and "extracting points in the grid after clustering and saving the points as different objects". The process of drawing frames may be specifically divided into operations of "extracting laser point cloud two-dimensional mapping outer contour points", "fitting a straight line with the Hough transform, calculating an inclination angle of the straight line", "rotating the point set coordinates and drawing the cube frame". The tracking process may be specifically divided into operations of "converting a coordinate system", "calculating the incidence matrix", and "calculating a best match with the Hungarian algorithm".

S203, performing the heterogeneous acceleration on at least one sub-algorithm to process the scanning data and obtain a processing result, and obtaining a detected position of the obstacle and the drivable area based on the processing result.

Specifically, in this embodiment, performing the heterogeneous acceleration on the at least one sub-algorithm to process the scanning data may be: parallel operations of obtaining M fitting straight lines based on the coordinates of the M two-dimensional mapping outer contour points and calculating M inclination angles of the M fitting straight lines. In a process of drawing the frame in the target detection algorithm, the Hough transform is used to fit the plane straight line for an edge of a single object, and then a three-dimensional bounding rectangular box of the object is obtained. The Hough transform is one of basic methods for recognizing geometric shapes from images in image processing. Compared with other methods, this method may reduce noise interference when finding the straight lines. A basic principle of the Hough transform is to use a duality of points and lines to transform a given curve in an original image space into a point in a parameter space through a curve expression. In this way, the problem of detecting a given curve of the original image is transformed into the problem of detecting a peak value of the parameter space. The Hough transform performs the same processing on each point, and there is a lot of repetitive work. With the heterogeneous acceleration, the different points are processed in parallel, and an operation process of each point realizes flow operation, which greatly reduces time consumption.

For ease of understanding, how to draw the cube frame of the obstacle is illustrated in detail below.

First of all, a representation of the straight line in the polar coordinate system is r=x·cos θ+y·sin θ. The Hough transform processes an image point set, and for each point ($x_0$, $y_0$), all straight lines passing through the point are drawn in the polar coordinate for a polar diameter plane and a polar angle plane to obtain a sinusoidal curve. If curves of two different points obtained after the above operations intersect in a plane θ-r, it means that the two different points pass through the same straight line. The above method does the same treatment for each point, and there is a lot of repetitive work. When performed with a CPU, the method may traverse all the points of the image in turn, and the time consumed is proportional to the number of the points. If the method is implemented with a field programmable gate array (FPGA), different points are appropriately processed in parallel, and an operation process of each point realizes flow operation, which can greatly reduce time consumption.

High-level synthesis (HLS) software is used to compile directive and optimize an algorithm implementation of the Hough transform to generate register transfer level (RTL) hardware description codes. The compile directive and optimize are operated as following principles.

(1) When defining internal variables, fixed-point types instead of floating-point types are preferentially used. In the HLS, data accuracy has a great influence on an occupancy rate of hardware resources. The HLS supports configurable fixed-point operations. On a premise that an accuracy requirement is satisfied, using fixed-point numbers may reduce hardware resource consumption and make the hardware run at a higher clock frequency.

(2) For a single-layer loop, the loop is designed as a pipeline mode, and to use pipeline optimization instruction set directive pipeline. A pipeline method may increase resource utilization, and a next loop does not need to wait until a previous cycle is fully completed before starting, thereby speeding up parallelism and speed of calculation.

(3) For a nested loop, the pipeline optimization instruction set directive pipeline may be used for an inner loop. In this way, loop layers below a current layer using the pipeline are automatically optimized and unrolled, and loops above the current layer (including this layer) may be degraded to single-layer loops. After an inner loop is unrolled, hardware circuits corresponding to inner operation operations may be copied multiple times to achieve a parallel processing.

(4) For segmenting an array, a segmenting optimization instruction set directive array partition is used. It should be noted that optimization of segmenting the array is not isolated, and needs to be combined with specific usage. The array is segmented and integrated into multiple block RAMs (which may also be designated as other types of RAM) to satisfy a simultaneous access of multiple interfaces and improve data throughput rate. When used in conjunction with multiple unfolded hardware circuits, parallel execution capability of the hardware circuits may be maximized.

It is understandable that there are many code implementations of the Hough transform, which will not be repeated here in order to avoid repetition. Each part of functional modules that contain a large number of image point intensive operations may be designed and optimized based on the above principles, so as to achieve FPGA parallel acceleration processing of the target detection drawing-frame function, and greatly reduce processing time delay.

It should be noted that in this embodiment, the heterogeneous acceleration may be performed on other operations of the edge extraction algorithm, and the heterogeneous acceleration may also be performed on the fitting algorithm and other algorithms of the segmentation and clustering. In other words, this embodiment does not specifically limit the types of algorithms for the heterogeneous acceleration, and does not specifically limit the number of algorithms for the heterogeneous acceleration. For example, the heterogeneous acceleration may be performed on the edge extraction algorithms and fitting algorithms at the same time to further improve computing performance of a system. In addition, how to obtain the detected position of the obstacle has been described in detail in S2021 to S2029 in this embodiment, which will not be repeated here in order to avoid repetition.

In the embodiment of the present disclosure, the algorithm splitting is performed on the feature algorithm used for detection based on the scanning data to obtain the at least one sub-algorithm capable of parallel processing in the feature algorithm. Since the feature algorithm has multiple implementation processes, at least one sub-algorithm capable of parallel processing in the feature algorithm is obtained by splitting the implementation process of the feature algorithm, so as to satisfy a heterogeneous acceleration condition. Then, the heterogeneous acceleration is performed on the at least one of sub-algorithms to process the scanning data. Since the sub-algorithms that may be processed in parallel are algorithms with large data volume, long calculation time and high CPU usage, thus overall time consumed of a laser radar perception algorithm can be effectively reduced by performing the heterogeneous acceleration on at least one sub-algorithm, thereby improving data calculation speed in the laser radar sensing process and reliability of the laser radar. In addition, since the sub-algorithm with a higher CPU occupancy rate greatly reduces the CPU occupancy rate after the heterogeneous acceleration, it is possible to select processors and heterogeneous computing devices with lower power consumption and cost, which reduces production cost of target detection devices based on the laser radar.

A third embodiment of the present disclosure relates to a detection method based on a laser radar. The third embodiment is further improved on the basis of the first embodiment. The specific improvement lies in: in the third embodiment, a second feature algorithm is further refined. The second feature algorithm includes a classification storage algorithm, a ground point determining algorithm, and a grid coloring algorithm. And in the third embodiment, an algorithmic splitting is performed on the classification storage algorithm of the second feature algorithm. In this way, it is possible to perform the algorithmic splitting on the time-consuming classification storage algorithm in the second feature algorithm, so that operations of the classification storage algorithm satisfy a heterogeneous acceleration condition to perform the heterogeneous acceleration on the classification storage algorithm, which can further improve data calculation speed in a laser radar sensing process, thereby further improving reliability of the laser radar.

Figure 8:
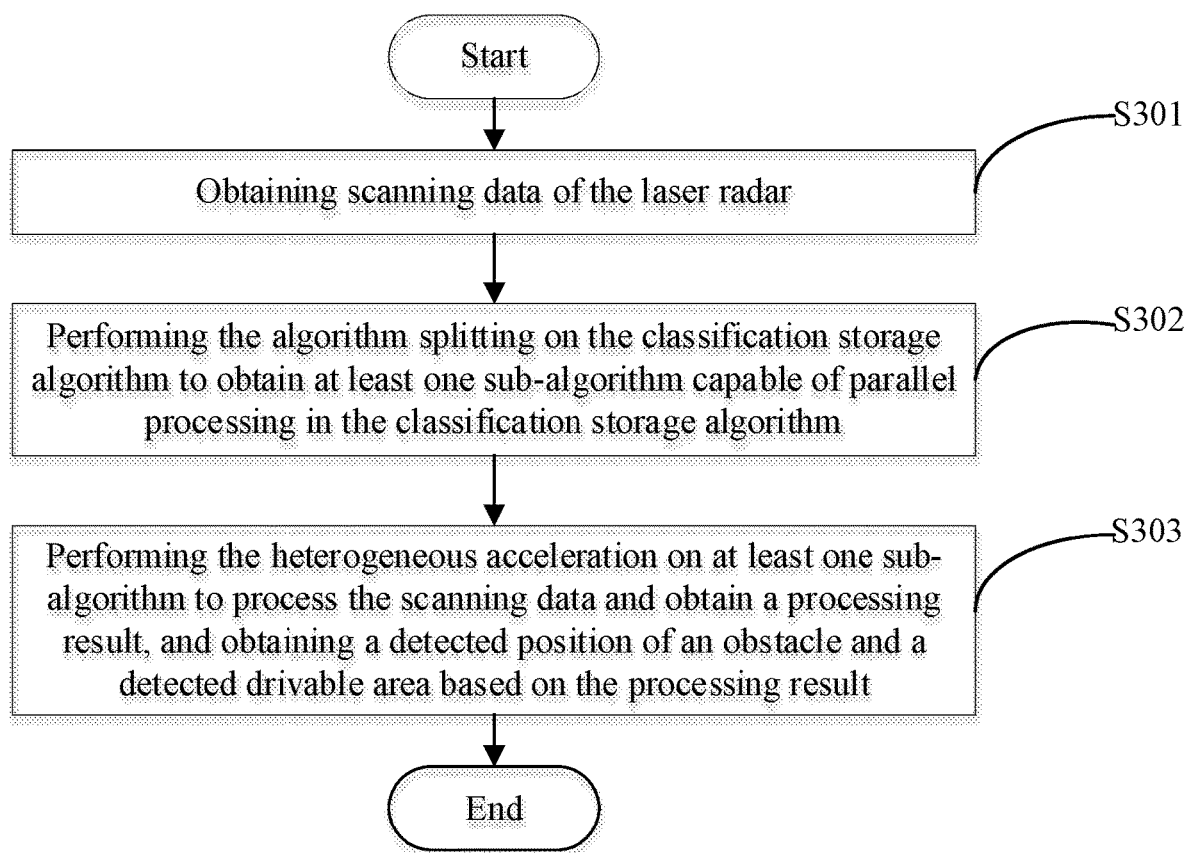
FIG. 8 is a flowchart of a detection method based on a laser radar according to a third embodiment of the present disclosure.

The specific process of this embodiment is shown in FIG. 8 and includes following operations.

S301, obtaining scanning data of the laser radar.

S302, performing the algorithm splitting on the classification storage algorithm to obtain at least one sub-algorithm capable of parallel processing in the classification storage algorithm.

Specifically, in this embodiment, the second feature algorithm may be a drivable area recognition algorithm. The drivable area recognition is to project point cloud data collected by the laser radar on a horizontal plane, then perform area segmentation, process point cloud data within a segmented area, and finally draw a conclusion whether the area is drivable or not. Generally speaking, the laser radar rotates rapidly while emitting high-frequency laser beams to continuously scan external environment. This working method is most suitable for an area segmentation method under a polar coordinate system. The drivable area recognition algorithm includes a classification storage algorithm for the scanning data by a 360-degree grid classification and storage; a ground point determining algorithm for acquiring ground points in the scanning data based on a result of the classification storage by the 360-degree grid classification and storage, and performing a preliminary coloring processing on the ground points; a grid coloring algorithm of the drivable area obtained by establishing a grid image based on the ground points and performing a refined coloring processing on the grid image. It is understandable that this embodiment can improve data operation speed in the laser radar sensing process by performing the algorithmic splitting on the classification storage algorithm.

Figure 9:
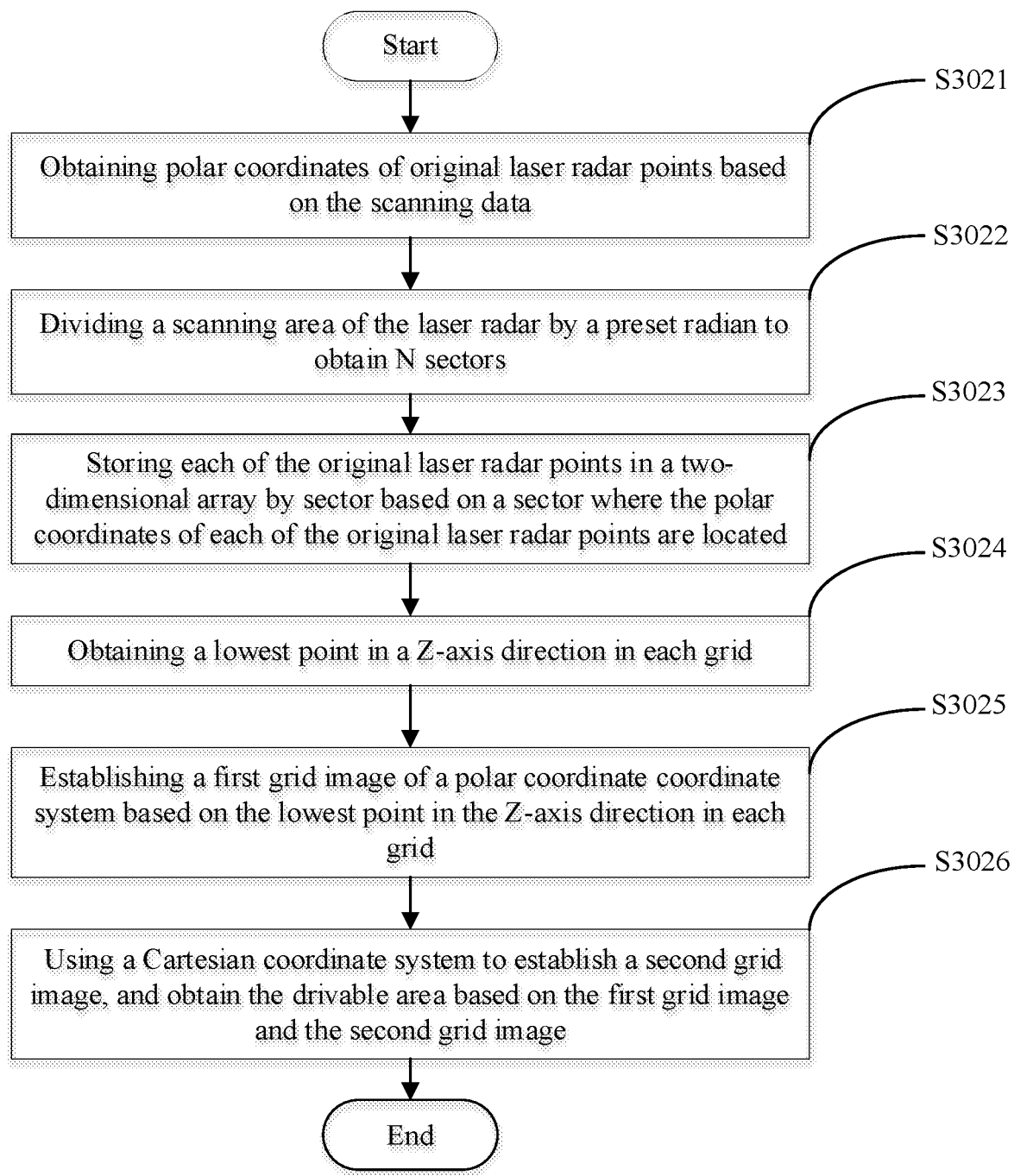
FIG. 9 is a flowchart of a drivable area recognition algorithm according to a third embodiment of the present disclosure.

In order to facilitate understanding and provide a further detailed description of the drivable area recognition algorithm, as shown in FIG. 9, the drivable area recognition algorithm may include following operations.

S3021, obtaining polar coordinates of original laser radar points based on the scanning data.

S3022, dividing a scanning area of the laser radar by a preset radian to obtain N sectors.

Specifically, N is an integer greater than 1, and divided N sectors are shown in FIG. 4.

S3023, storing each of the original laser radar points in a two-dimensional array by sector based on a sector where the polar coordinates of each of the original laser radar points are located.

It is worth mentioning that the above S3021 to S3023 are operations of the classification storage algorithm. The original laser points may be classified and stored by performing S3021 to S3023.

S3024, obtaining a lowest point in a Z-axis direction in each grid.

S3025, establishing a first grid image of a polar coordinate system based on the lowest point in the Z-axis direction in each grid.

Specifically, the grid images of the polar coordinate system corresponding to the lowest point in the Z-axis direction in each grid are established, all of the grid images are initialized to 1, and an origin is taken as the polar coordinate to diverge outward, and a position with no laser point is marked as 0. Compared with a lowest point of a current grid, the laser points determined to be a ground is marked as 0. For a position determined to be not the ground, from the grid and behind the sector, are marked as 1. After traversing all the laser points, the first grid image is expanded to facilitate a clearer observation of the first grid image.

It is worth mentioning that the above S3024 to S3025 are operations of the ground point determining algorithm. By performing S3024 to S3025, ground points and non-ground points may be determined, and the ground points may be colored.

S3026, using a Cartesian coordinate system to establish a second grid image, and obtaining the drivable area based on the first grid image and the second grid image.

Specifically, the Cartesian coordinate system is used to establish a higher-precision image grid 500*500, and a coverage accuracy of each pixel is 0.1*0.1 (m). This image grid is used to determine whether the same position in the polar coordinate grid is 0. 0 means a drivable area; otherwise the position is marked as a non-driving area.

It is worth mentioning that S3026 is an operation of the grid coloring algorithm. By performing S3026, the drivable area may be drawn finally.

S303, performing the heterogeneous acceleration on at least one sub-algorithm to process the scanning data and obtain a processing result, and obtaining a detected position of an obstacle and a detected drivable area based on the processing result.

Specifically, in this embodiment, performing the heterogeneous acceleration on the at least one sub-algorithm to process the scanning data may be: storing each of the original laser radar points in a two-dimensional array by sector in parallel. In this process, it is necessary to traverse all the original laser radar point data, calculate an index position of each point mapped to the grid, and store the index position in the grid. The process adopts the heterogeneous acceleration to realize and uses a pipeline mode for calculation of different points, so that coordinate conversion and regional attribute calculation of each point may be completed in only one clock, which is thousands of times more efficient than conventional CPUs.

For ease of understanding, how to store each of the original laser radar points in the two-dimensional array by the sector in parallel is illustrated in detail below.

First, the point cloud data collected by the laser radar is projected on the horizontal plane, and then the area is segmented, and the points are classified and stored based on a segmented grid. In this process, it is necessary to traverse all the original point cloud data, calculate the index position of each point mapped to the grid, and store the index position in the grid. The process adopts the heterogeneous acceleration to realize and uses the pipeline mode for calculation of different points, so that the coordinate conversion and regional attribute calculation of each point may be completed in only one clock, which is thousands of times more efficient than conventional CPUs. The specific operations are as follows.

The horizontal plane is segmented into areas in the polar coordinate system based on 'r' and θ of a certain step, and then all the point cloud data in the spatial Cartesian rectangular coordinate system are projected on the horizontal plane to obtain feature description data of a planar rectangular coordinate system. Then a coordinate conversion is performed to obtain feature description data in the polar coordinate system. After that, which segmented area the point is located in is calculated based on the feature description data, and the point feature data is stored in a container corresponding to the area.

For ease of description, meanings of related symbols are defined as follows:

r: radius variable in the polar coordinate system;
θ: polar angle variable in the polar coordinate system;
L: radius of a polar coordinate plane circle;
γ': cutting step length of a polar radius axis;
θ': cutting step length of a polar angle axis;
M: the number of blocks segmented along the polar radius;
N: the number of blocks segmented along the polar angle;
X: x-coordinate direction value of a point cloud feature data in a rectangular coordinate system;
Y: y-coordinate direction value of the point cloud feature data in the rectangular coordinate system;
Z: z-coordinate direction value of the point cloud feature data in the rectangular coordinate system;
PointCloud_Array: point cloud data array, each element of the array is x, y, z;
M: a block number of a point cloud in a polar radius direction;
N: a block number of a point cloud in a polar angle direction;
PointAttr_Array: point cloud attribute information array, each element of the array is m, n;
Size: the number of elements in the point cloud data array.

(1) Taking the laser radar as the origin, a circle of r(θ)=L (radius is L) is cut equally on the polar radius axis and for the polar angle axis on the horizontal plane, where the cutting step length of the polar radius axis is r', the cutting step of the angular axis is θ', then a total number of segmented areas is (L/r')*(2π/), L/r' is recorded as M, 2π/θ' is recorded as N, then the circle with radius L is divided into M*N areas.

(2) First, the point cloud data of the same data type are saved uniformly. A specific memory is allocated based on amount of point cloud data, and all point cloud feature data (x, y, z) sets in the spatial Cartesian right angle coordinate system are sequentially stored in the memory to form the array PointCloud_Array. It should be noted that the point clouds or other data of the same type are stored in arrays, and data structures with dynamic memory management, such as vectors should be avoided. The purpose here is to facilitate a HLS to optimize an acceleration module and use an AXI bus to directly access an external storage device. Another function of the array is that the HLS may be used to map the array as a storage resource inside a FPGA to implement concurrent access, which will be used in subsequent embodiments. The following embodiments all comply with this principle.

(3) A specific memory is allocated based on the amount of point cloud data to store the attribute information of each point area calculated by hardware acceleration to form the array PointAttr_Array which corresponds to elements of the PointCloud_Array array one by one.

(4) A first address of the PointCloud_Array array and a size of the array are passed to an acceleration function as input parameters. When designing the acceleration function, an access mode of the array is set to sequential access, so that the FPGA accesses the memory continuously during a process of transporting data from the memory to a logic unit. At the same time, a zero_copy (zero copy) instruction is used to make a compiler directly connect an interface of the hardware accelerator to a S_AXI port of the processor to complete data transmission, which greatly improves performance of the interface.

(5) A first address of the PointAttr_Array array is passed to the acceleration function as output parameters, and the access mode of the array is also set to sequential access, and the zero_copy instruction is used to describe data transmission mode of the array.

(6) A single-layer loop body with a loop number of size is inside a FPGA acceleration function. Each loop processes one point cloud data. A pipeline PIPELINE instruction may be used to optimize the loop body. With this type of optimization, the FPGA may read data required by a i+1th loop while calculating data for a i-th loop, and may save calculation results output by a i−1th loop at the same time. Each loop operations like this: first a PointCloud_Array array element point (x, y, z) is read, and then feature data (r, θ) of the element's polar coordinate system is calculated and obtained through formulas $r=\sqrt{x^2+y^2}$ and θ=atan 2(y,x), m=r/r' and m<=M, n=θ/θ' and n<=N are recorded. So far, a result that a point (x, y, z) is located in a (m, n) area block is calculated, and finally (m, n) is stored in the PointAttr_Array array corresponding to the point.

It should be noted that how to obtain the detected drivable area is described in detail in operations S3021 to S3026 in this embodiment, which will not be repeated here in order to avoid repetition.

In the embodiment of the present disclosure, the algorithm splitting is performed on the feature algorithm used for detection based on the scanning data to obtain at least one sub-algorithm capable of parallel processing in the feature algorithm. Since the feature algorithm has multiple implementation processes, at least one sub-algorithm capable of parallel processing in the feature algorithm is obtained by splitting the implementation processes of the feature algorithm, so as to satisfy a heterogeneous acceleration condition. Then, the heterogeneous acceleration is performed on the at least one sub-algorithm to process the scanning data. Since the sub-algorithms capable of parallel processing are algorithms with large data volume, long calculation time and high CPU usage, overall time consumed of a laser radar perception algorithm can be effectively reduced by performing the heterogeneous acceleration on the at least one sub-algorithm, thereby improving data calculation speed in the laser radar sensing process and reliability of the laser radar. In addition, since the sub-algorithm with a higher CPU occupancy rate greatly reduces the CPU occupancy rate after the heterogeneous acceleration, it is possible to select processors and heterogeneous computing devices with lower power consumption and cost, which can reduce production cost of target detection devices based on the laser radar.

A fourth embodiment of the present disclosure relates to a detection method based on a laser radar. The fourth embodiment is roughly the same as the third embodiment. The main difference is that in the fourth embodiment, performing an algorithmic splitting on at least one of a classification and storage algorithm, a ground point determining algorithm and a grid coloring algorithm specifically is: performing the algorithmic splitting on the grid coloring algorithm. Performing the algorithmic splitting on the grid coloring algorithm specifically is: splitting the grid coloring algorithm into following operations: determining whether each grid in a grid image is a ground, and performing a coloring processing for the grids determined to be the ground. In this way, it is possible to perform the algorithmic splitting on the time-consuming grid coloring algorithm in the second feature algorithm, so that operations of the grid coloring algorithm satisfy a heterogeneous acceleration condition to perform a heterogeneous acceleration on the grid coloring algorithm, which can further improve data calculation speed in a laser radar sensing process, thereby further improving reliability of the laser radar.

Figure 10:
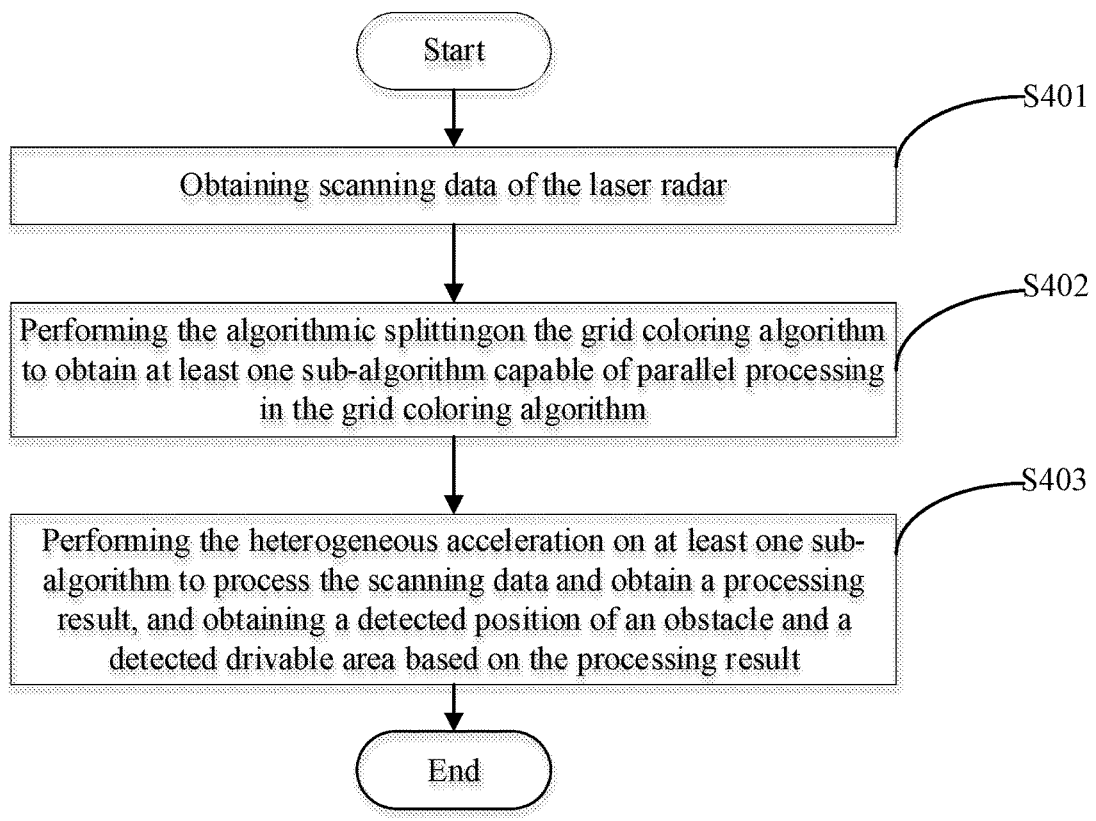
FIG. 10 is a flowchart of a detection method based on a laser radar according to a fourth embodiment of the present disclosure.

The specific process of this embodiment is shown in FIG. 10, and includes following operations.

S401, obtaining scanning data of the laser radar.

S402, performing the algorithmic splitting on the grid coloring algorithm to obtain at least one sub-algorithm capable of parallel processing in the grid coloring algorithm.

Specifically, the drivable area recognition algorithm includes a classification storage algorithm for the scanning data by a 360-degree grid classification and storage; a ground point determining algorithm for acquiring ground points in the scanning data based on a result of the 360-degree grid classification and storage and performing a preliminary coloring processing on the ground points; a grid coloring algorithm of the drivable area obtained by establishing a grid image based on the ground points and performing a refined coloring processing on the grid image. It is understandable that this embodiment improves data operation speed in a laser radar sensing process by performing the algorithmic splitting on the grid coloring algorithm.

S403, performing the heterogeneous acceleration on at least one sub-algorithm to process the scanning data and obtain a processing result, and obtaining a detected position of an obstacle and a detected drivable area based on the processing result.

Regarding S404, specifically, performing the heterogeneous acceleration on at least one sub-algorithm to process the scanning data in this embodiment may be: parallel operations of determining whether each grid in the grid image is the ground and performing the coloring processing for the grid determined to be the ground. A ground area coloring is to mark the driving area with color, and then the driving area is sent to a visualization interface for display. The ground area coloring may traverse all areas to be colored, calculate a corresponding positional relationship between the grid in a previous step and an area to be colored for each area, extract the ground information in the grid and color the grid in a square. This process adopts the heterogeneous acceleration to realize and different areas are processed appropriately in parallel, and a flow operation is realized for operations before and after, which can greatly reduce time consumption.

For ease of understanding, how to determine whether each grid in the grid image is the ground and perform the coloring processing on the grid determined to be the ground in parallel is illustrated in detail below.

An input of a processing unit that processes a ground coloring function is the grid output in the previous step, and each grid has been marked as the ground or not. As shown in a first part of FIG. 12, 0 represents the ground area, and 1 represents a non-ground area. The colored area is limited to a square, which is fixedly divided into 500×500 parts. For each part of the colored area, it is necessary to extract a corresponding position in the grid and determine whether the corresponding position is the ground. In response to the corresponding position being the ground, the square is colored; in response to the corresponding position being not the ground, the square is not colored. Referring to a second part of FIG. 12, values represent a depth of coloring, 60 represents a drivable road, and 90 represents an undrivable area.

In the above process, 500×500 parts of the area to be colored need to be traversed, and for each part, the corresponding position relationship between the grid and the area to be colored is calculated, and the ground information in the grid is extracted and the coloring processing is performed in a square. The operation of each area is relatively independent, and there is no dependency between each other. If executed by a CPU, the operations are processed in sequence, and time consumed is proportional to the number of parts divided in the area; if implemented with a FPGA, different colored areas may be properly processed in parallel, and a flow operation may be realized for operations before and after, which can greatly reduce time consumption.

HLS is used to compile directive and optimize the process, and then RTL-level hardware description codes are generated. A code structure of the coloring part is as follows:

FPGA to achieve concurrent access. During execution of the acceleration module, no data interaction is performed between heterogeneous processors until result data is transmitted. In this way, frequent accesses between the heterogeneous processors can be reduced and computing performance may be greatly improved.

A pipeline optimization instruction set directive pipeline is used for loop 1. This instruction makes loop 2 optimized and unrolled. A hardware circuit generated by content in curly brackets of loop 2 is copied into multiple copies, and loop 1 itself has no effect. A segmentation optimization instruction set directive array partition is used for the array colour[ ]. The segmentation optimization instruction set directive array partition may be used for both dimensions of the array grid_info[ ]. The array is mapped into multiple block RAMs after synthesis, and multiple data may be accessed at the same time based on the number of segmentations, which matches the multiple hardware circuits unrolled by loop 2, and realizes the parallel processing of data. The number of segmentations of the array colour[ ] and array grid_info[ ] may be adjusted as needed. The more number of segmentations is, the more number of ports a RAM provides, the better the performance is, but the more resources are occupied. On the contrary, the fewer number of RAM ports, the worse the performance is, but the less resources are occupied. The above operations may realize a FPGA parallel acceleration processing of a ground area coloring function, which can greatly reduce processing time delay.

In the embodiment of the present disclosure, the algorithm splitting is performed on the feature algorithm used for detection based on the scanning data to obtain at least one sub-algorithm capable of parallel processing in the feature algorithm. Since the feature algorithm has multiple implementation processes, at least one sub-algorithm capable of parallel processing in the feature algorithm is obtained by splitting the implementation processes of the feature algorithm, so as to satisfy a heterogeneous acceleration condition. Then, the heterogeneous acceleration is performed on at least one of the sub-algorithms to process the scanning data. Since the sub-algorithms capable of parallel processing are algorithms with large data volume, long calculation time

```
Loop 1: for (x = 0; x <500; x++){
    Loop 2: for (y = 0; y <500; y++){
Initialize color of the area to be colored
    eg. colour[y * 500 + x] = 90;
Calculate positions a, b of the grid corresponding to the coloring area represented by the
index value x, y
Extract ground information of the grid area
Determine whether the grid area is the ground and color the grid area
eg.
    if(grid_info[a,b] == 0) // is the ground
        colour[y * 500 + x] = 60; //coloring
    }
}
```

In the above code structure, loop 1 and loop 2 traverse an entire coloring area, and the number of loops is a constant. Variables x, y are used to index the position of the coloring area, and variables a, b are used to index the position of the grid. The array grid_info[ ] stores the grid information, and the array colour[ ] stores the coloring area information.

The above code is located in an acceleration module, and both the array grid_info[ ] and colour[ ] are internally defined. An acceleration function first copies an input external array to an internal array of the function, and the HLS finally maps the internal array to storage resource inside the and high CPU usage, overall time consumed of a laser radar perception algorithm can be effectively reduced by performing the heterogeneous acceleration on at least one sub-algorithm, thereby improving data calculation speed in the laser radar sensing process and reliability of the laser radar. In addition, since the sub-algorithm with a higher CPU occupancy rate greatly reduces the CPU occupancy rate after the heterogeneous acceleration, it is possible to select processors and heterogeneous computing devices with lower power consumption and cost, which can reduce production cost of target detection devices based on the laser radar.

A fifth embodiment of the present disclosure relates to a computer-readable storage medium storing a computer program. When executed by a processor, the computer program allows the processor to perform the above method embodiments.

That is, those skilled in the art may understand that all or part of the operations in the methods of the above embodiments may be implemented by instructing a relevant hardware through a program. The program is stored in a storage medium and includes several instructions to enable a device (may be a single-chip microcomputer, a chip, etc.) or the processor to perform all or part of the operations of the methods described in the embodiments of the present disclosure. The aforementioned storage medium includes: a U disk, a mobile hard disk, a read-only memory (ROM), a random access memory (RAM), a magnetic disk or an optical disk and various other mediums that may store program codes.

Figure 11:
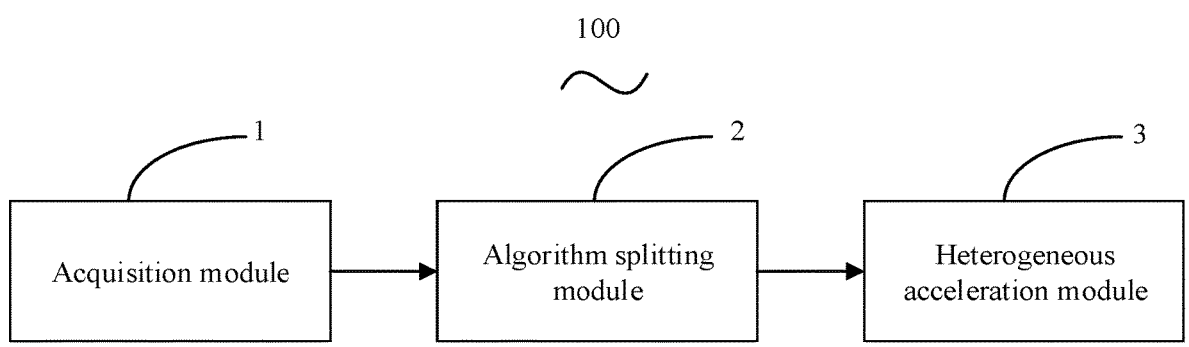
FIG. 11 is a schematic structural diagram of a detection device based on a laser radar according to a sixth embodiment of the present disclosure.

A sixth embodiment of the present disclosure relates to a detection device 100 based on a laser radar. A specific structure of the detection device is shown in FIG. 11, including: an acquisition module 1, an algorithm splitting module 2, and a heterogeneous acceleration module 3. The acquisition module 1 is configured to obtain scanning data of the laser radar and send the scanning data to the algorithm splitting module 2. The algorithm splitting module 2 is configured to receive the scanning data, and perform an algorithm splitting on a feature algorithm used for detection based on the scanning data to obtain at least one sub-algorithm capable of parallel processing in the feature algorithm. The heterogeneous acceleration module 3 is configured to perform the heterogeneous acceleration for the at least one sub-algorithm to process the scanning data to obtain a processing result, and obtain a detected position of an obstacle and a detected drivable area based on the processing result.

It should be noted that the detection device 100 based on the laser radar may also not include the acquisition module 1, but directly obtain the scanning data of the laser radar through the algorithm splitting module 2, so that the detection device 100 based on the laser radar has a simpler structure.

Specifically, the feature algorithm in this embodiment may be a target detection and tracking algorithm and a drivable area recognition algorithm. That is, the algorithm splitting module 2 has two functions: one is to realize the target detection and tracking algorithm and the drivable area recognition algorithm, the other is to reasonably split implementation processes of the two algorithms. The heterogeneous acceleration module 3 selects a parallel processing part in the algorithm splitting module 2 to achieve the heterogeneous acceleration.

It is worth mentioning that, after an algorithm is split by the algorithm splitting module, operation operations with characteristics of "large amount of data, time-consuming and capable of being realized through the parallel processing" may be implemented by using heterogeneous acceleration methods, which belongs to the protection scope of the present disclosure. In addition, in the embodiments, high-level synthesis (HLS) technology may be used for a FPGA implementation, but the present disclosure includes but is not limited to this method. Conventional RTL language may also be used.

Obviously, those skilled in the art should understand that the modules or operations of the present disclosure may be implemented by a general computing device, may be concentrated on a single computing device or distributed in a network composed of multiple computing devices. Alternatively, the modules or operations of the present disclosure may be implemented with program codes executable by the computing device, so that the modules or operations may be stored in a storage device for execution by the computing device. In some cases, the operations shown or described may be performed in a different order than herein, or may be made into integrated circuit modules separately, or a plurality of modules or operations thereof may be made into a single integrated circuit module for implementation. In this way, the present disclosure is not limited to any specific combination of hardware and software.

A seventh embodiment of the present disclosure relates to a detection device based on a laser radar. As shown in FIG. 13, the detection device includes: at least one processor 701; and a memory 702 communicatively connected with the at least one processor 701. Herein, the memory 702 stores an instruction that may be executed by the at least one processor 701. When executed by the at least one processor 701, the instruction allows the at least one processor 701 to perform the detection method based on the laser radar.

Herein, the memory 702 and the processor 701 are connected in a bus manner, and the bus may include any number of interconnected buses and bridges, and the bus connects various circuits of one or more of the processor 701 and the memory 702 together. The bus may also connect various other circuits such as peripheral devices, voltage regulators, power management circuits and the like, which are all known in the existing technology, and therefore, will not be further described herein. A bus interface provides an interface between the bus and a transceiver. The transceiver may be one element or a plurality of elements, such as a plurality of receivers and transmitters, providing a unit for communicating with various other devices on a transmission medium. Data processed by the processor 701 is transmitted on a wireless medium through an antenna. Further, the antenna also receives the data and transmits the data to the processor 701.

The processor 701 is responsible for managing the bus and general processing, and may also provide various functions, including timing, peripheral interfaces, voltage regulation, power management, and other control functions. The memory 702 may be used to store data used by the processor 701 when performing operations.

A person of ordinary skill in the art may understand that the above-mentioned embodiments are specific examples for realizing the present disclosure, and in practical applications, various changes may be made in form and details without departing from the spirit and scope of the present disclosure.

What is claimed is:

1. A detection method based on a laser radar, comprising:
obtaining scanning data of the laser radar;
performing algorithm splitting on a feature algorithm used for detection based on the scanning data to obtain at least one sub-algorithm capable of parallel processing in the feature algorithm;
performing heterogeneous acceleration on the at least one sub-algorithm to process the scanning data and to obtain a processing result; and
obtaining a detected position of an obstacle and a detected drivable area based on the processing result.

2. The detection method based on the laser radar according to claim 1, wherein the performing the algorithm splitting on the feature algorithm used for detection based on the scanning data to obtain the at least one sub-algorithm capable of parallel processing in the feature algorithm comprises:

performing the algorithm splitting on a first feature algorithm used to detect a position of the obstacle based on the scanning data and on a second feature algorithm used to detect a drivable area based on the scanning data, to obtain a plurality of first sub-algorithms capable of parallel processing in the first feature algorithm and a plurality of second sub-algorithms capable of parallel processing in the second feature algorithm; and the performing the heterogeneous acceleration on the at least one sub-algorithm to process the scanning data specifically comprises:

performing the heterogeneous acceleration on at least one of the plurality of first sub-algorithms and/or at least one of the plurality of second sub-algorithms to process the scanning data.

3. The detection method based on the laser radar according to claim 2, wherein the first feature algorithm comprises:

a fitting algorithm for fitting a ground based on the scanning data;

a segmentation clustering algorithm for segmenting and clustering the obstacle based on a result of fitting the ground;

an edge extraction algorithm for extracting an edge frame of the obstacle based on a result of the segmentation and clustering; and a position recognition algorithm for recognizing the position of the obstacle based on the edge frame; and the performing the algorithm splitting for the first feature algorithm used to detect the position of the obstacle based on the scanning data comprises:

performing the algorithm splitting on at least one of the fitting algorithm, the segmentation clustering algorithm, the edge extraction algorithm, and the position recognition algorithm.

4. The detection method based on the laser radar according to claim 3, wherein when performing the algorithm splitting on the edge extraction algorithm, the edge extraction algorithm is split into following operations:

extracting coordinates of M two-dimensional mapping outer contour points of the obstacle based on the result of the segmentation and clustering, wherein M is an integer greater than 1;

obtaining M fitting straight lines based on the coordinates of the M two-dimensional mapping outer contour points, and calculating M inclination angles of the M fitting straight lines, wherein one of the two-dimensional mapping outer contour points corresponds to one inclination angle;

rotating corresponding two-dimensional mapping outer contour points based on the inclination angles to obtain a cube frame of the obstacle.

5. The detection method based on the laser radar according to claim 4, wherein the performing the heterogeneous acceleration on at least one of the plurality of first sub-algorithms and/or at least one of the plurality of second sub-algorithms specifically is:

performing the heterogeneous acceleration on at least one of edge extraction algorithms; and the performing the heterogeneous acceleration on at least one of the edge extraction algorithms comprises:

parallel operations of obtaining M fitting straight lines based on the coordinates of the M two-dimensional mapping outer contour points and calculating the M inclination angles of the M fitting straight lines.

6. The detection method based on the laser radar according to claim 2, wherein the second feature algorithm comprises:

a classification storage algorithm for the scanning data by a 360-degree grid classification and storage;

a ground point determining algorithm for acquiring ground points in the scanning data based on a result of the 360-degree grid classification and storage, and performing a preliminary coloring processing on the ground points; and a grid coloring algorithm of the drivable area obtained by establishing a grid image based on the ground points and performing a refined coloring processing on the grid image; and the performing the algorithmic splitting on the second feature algorithm used to detect the drivable area based on the scanning data comprises:

performing the algorithmic splitting on at least one of the classification storage algorithm, the ground point determining algorithm, and the grid coloring algorithm.

7. The detection method based on the laser radar according to claim 6, wherein when performing the algorithmic splitting on the classification storage algorithm, the classification storage algorithm is split into following operations:

obtaining polar coordinates of original laser radar points based on the scanning data;

dividing a scanning area of the laser radar by a preset radian to obtain N sectors, wherein N is an integer greater than 1;

storing each of the original laser radar points in a two-dimensional array by sector based on a sector where the polar coordinates of each of the original laser radar points are located.

8. The detection method based on the laser radar according to claim 7, wherein the performing the heterogeneous acceleration on at least one of the plurality of first sub-algorithms and/or at least one of the plurality of second sub-algorithms specifically is:

performing the heterogeneous acceleration on at least one of the classification storage algorithms; and the performing the heterogeneous acceleration on at least one of the classification storage algorithms comprises:

parallel operations of the sector where the polar coordinates of each of the original laser radar points are located and storing each of the original laser radar points in the two-dimensional array formed by the sector.

9. The detection method based on the laser radar according to claim 6, wherein performing the algorithm splitting on at least one of the classification storage algorithm, the ground point determining algorithm, and the grid coloring algorithm specifically is:

performing the algorithmic splitting on the grid coloring algorithm; and the performing the algorithmic splitting on the grid coloring algorithm specifically is:

splitting the grid coloring algorithm into following operations:

determining whether each grid in the grid image is a ground, and performing a coloring processing on the grid determined to be the ground.

10. The detection method based on the laser radar according to claim 9, wherein the performing the heterogeneous acceleration on at least one of the plurality of first sub-algorithms and/or at least one of the plurality of second sub-algorithms specifically is:

performing the heterogeneous acceleration on at least one of the plurality of second sub-algorithms; and the performing the heterogeneous acceleration on at least one of the plurality of second sub-algorithms specifically comprises:

parallel operations of determining whether each grid in the grid image is the ground and performing the coloring processing for the grid determined to be the ground.

11. A non-transitory computer-readable storage medium storing a computer program, when executed by a processor, allows the processor to perform a detection method based on a laser radar, wherein the detection method comprises:

obtaining scanning data of the laser radar;

performing algorithm splitting on a feature algorithm used for detection based on the scanning data to obtain at least one sub-algorithm capable of parallel processing in the feature algorithm;

performing heterogeneous acceleration on the at least one sub-algorithm to process the scanning data and to obtain a processing result; and obtaining a detected position of an obstacle and a detected drivable area based on the processing result.

12. A detection device based on a laser radar, comprising a memory and a processor, wherein the memory stores a computer program that, when executed by the processor, allows the processor to perform a detection method based on a laser radar;

wherein the detection method comprises:

obtaining scanning data of the laser radar;

performing algorithm splitting on a feature algorithm used for detection based on the scanning data to obtain at least one sub-algorithm capable of parallel processing in the feature algorithm;

performing heterogeneous acceleration on the at least one sub-algorithm to process the scanning data and to obtain a processing result; and obtaining a detected position of an obstacle and a detected drivable area based on the processing result.

* * * * *